Sept. 8, 1970 R. G. LELAND 3,526,918
FLEXIBLE WINDOW WASHER AND WIPER
Filed Sept. 24, 1968
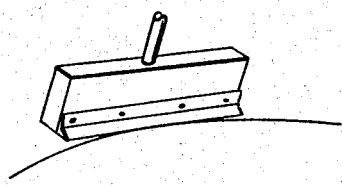
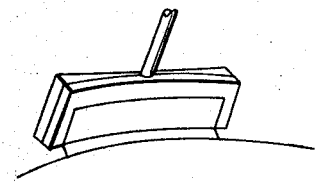
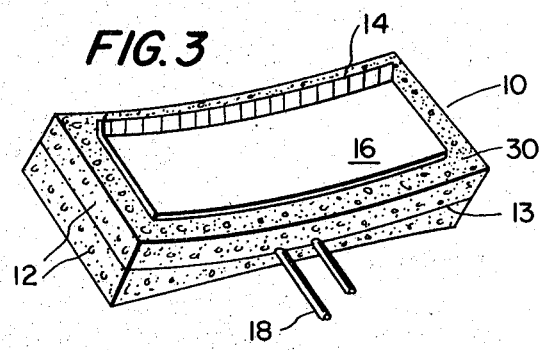
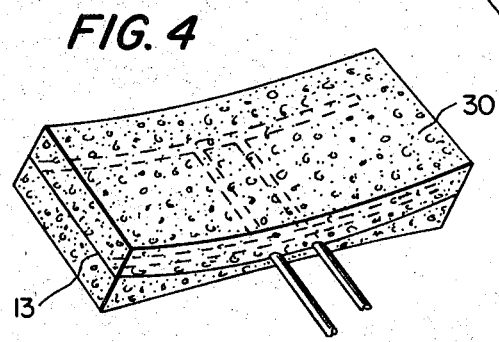
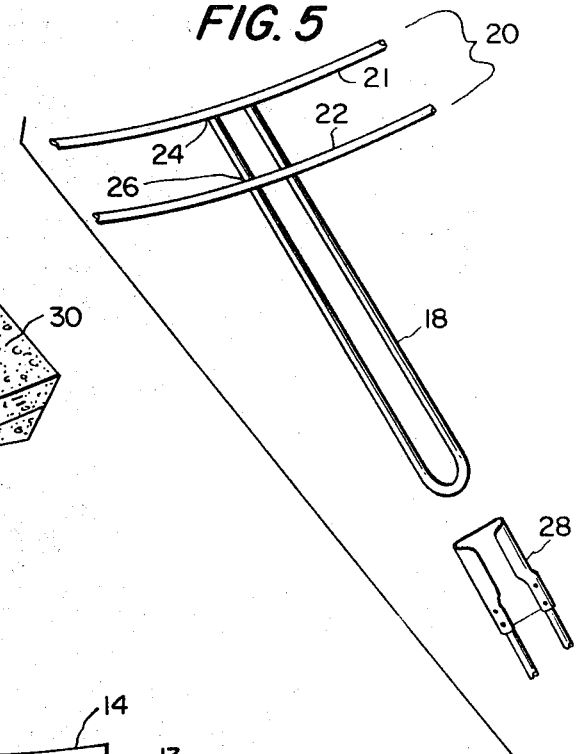
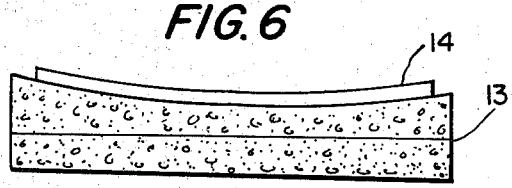
INVENTOR
RAGNVALD G. LELAND
BY Derman, Landon & Derman
ATTORNEYS

United States Patent Office 3,526,918
Patented Sept. 8, 1970

---

3,526,918
FLEXIBLE WINDOW WASHER AND WIPER
Ragnvald G. Leland, 2334 W. 241st St.,
Lomita, Calif. 90717
Filed Sept. 24, 1968, Ser. No. 761,971
Int. Cl. A47l 1/08; B60s 1/04
U.S. Cl. 15—121                                    3 Claims

ABSTRACT OF THE DISCLOSURE

A combination flexible window washer and wiper assembly suitable for curved windows by having a porous, compressible spongelike pad, a resilient blade member and handle means attached to said pad for the purpose of washing and wiping a curved surface.

---

This invention relates broadly to an improved flexible washer and wiper combination for cleaning curved windows and more particularly a window washer and wiper combination having a sponge-type pad with a resilient rubber-like blade member secured thereto for use on curved windows. Handle means secured to said pad are also provided.

Resilient wiper blade devices are well known in the art. The automatic windshield wiper is an example of such a device. Another type frequently encountered is one commonly used by window washers in their daily pursuit which is essentially a rubber blade rigidly clamped between wooden or metal holders to provide substantially straight line contact with an underlying wet surface.

Both devices, while satisfactory for the particular purpose thereon used, are unsuitable for manually cleaning curved windows.

It is therefore a primary object of the instant invention to provide a combination window washer and wiper particularly suitable for curved windows which is inexpensive in construction, durable, and easy to use.

Another object of this invention is to provide a three-dimensionally compressible pad having a porous structure for liquid absorption, a two-dimensionally resilient blade attached to said pad and handle means cooperating with said pad to enable the user to efficiently apply and remove liquids from a curved surface.

Another object of this invention is to provide an integral compressible pad of generally rectangular shape comprised of a pair of mating pads glued together, one of said pads having a concave surface to which a wiper blade is attached, said pads further securing handle means placed centrally therebetween.

Other objects and advantages of this invention will be made readily apparent from the disclosure in the attached specification and from the accompanying drawing, wherein:

FIG. 1 illustrates applying a rigid wiper device to a curved surface whereby only a small portion of said rigid wiper contacts said surface;

FIG. 2 illustrates applying one embodiment of this invention to a curved surface whereby the entire wiper length conforms to and contacts said surface;

FIG. 3 is a partial isometric view of a preferred embodiment of this invention;

FIG. 4 illustrates, in phantom, the internal positioning of one embodiment of a holder means located within the pad;

FIG. 5 is an isometric view of a handle assembly including a handle, holder means, and a portion of an extension of the handle with attaching clamp for use with the washer and wiper pad of FIG. 3; and FIG. 6 is a top view of the washer and wiper pad combination and illustrates a pad and wiper blade external surface having a concave configuration.

Referring now to the drawing, wherein like numerals indicate like elements throughout the several views, a specific embodiment, generally indicated by the numeral 10, is shown in FIG. 3. Referring specifically to FIG. 3, window washer and wiper combination 10 comprises a pair of three-dimensionally compressible pad members 12 suitably joined to form an integral unit, a two-dimensionally resilient wiper blade 14 and flange member 16 externally secured to said pad members 12 and a handle 18 internally secured to said pad members 12 by holder means 20.

Pad members 12 may be of any shape but are preferably of rectangular shape constructed of spongy compressible material having interconnecting pores releasably absorbing liquid placed in contact therewith. Absorbent materials derived from natural and synthetic sources may be used. These may be of cellulose, natural sponge, rubber, polyurethane, leather, nylon, etc., or any combination thereof. Such materials are generally available in a variety of suitable forms such as porous sheet, slab or block-like form, woven or non-woven fabrics, moldable powders or other resins capable of being foamed.

Pad members 12 are preferably shown to be of approximately equal dimension, adhesively joined with a suitable glue or other appropriate adhesive at the larger inner surface 13 which extends the length of the adjacently opposing pad members 12 to form an integral unit. A preferred embodiment, as shown in FIG. 4, adhesively secures holder means 20 to the pad members 12 to form an integral unit. A preferred embodiment, as shown in FIG. 4, adhesively secures holder means 20 to the pad members 12 at the internal inner surface 13, thereby providing means for transmitting compressive forces to said pad members 12.

In lieu of a plurality of pad members 12, the pad may be of a single member appropraitely slitted and glued so as to accommodate and secure holder means 20, and handle 18.

Alternatively, a single pad may be molded in-situ with holder 20 and handle 18 centrally positioned therein so as to be attached when the pad is removed from the mold or die thereby eliminating subsequent slitting or gluing operations.

Wiper blade flange 16, as shown in FIG. 3, is adhesively secured to the concave face of pad 12. Wiper blade 14 being an integral part of flange 16 thereby conforms to the pad surface 30 extending in a plane perpendicular to said pad surface. Both pad surface 30 and the blade edge 14 may be flat and parallel to one another. However, the preferred embodiment provides for an arcuate surface as shown for more efficient conformity with curved windows.

Other positions for locating and securing flange 16 to pad members 12 are possible. For example, flange 16 may be secured internally with blade 14 extending beyond a face of a pad.

Wiper blade 14 and flange 16 may be constructed of any suitable natural or synthetic resilient material, such as rubber, polyethylene, polyurethane, leather or the like. A preferred rubber wiper blade 14 will conform two-dimensionally to a curved surface along its length thereby wiping said surface free of liquid when pressure is transmitted to handle 18 and holder means 20. The applied force is transmitted via holder means 20, causing pad members 12 to elastically deform.

Handle 18 and holder means 20 described earlier as being suitably attached to pad members 12 may be constructed of metallic or non-metallic materials capable of withstanding exposure to a variety of cleaning fluids such as water, soap solutions, degreasing agents or the like. Any number of conventional materials such as steel, brass, plastics, wood, etc., are generally suitable for such use. As shown in FIG. 5, a preferred handle and holder means embodiment of simple construction comprises a generally U-shaped wire handle 18 with holder means 20 attached thereto, said holder means 20 having a plurality of flat spring-like extension members 21, 22 attached to the upper portion of said handle 18 at points 24, 26 perpendicular to the longitudinal axis of said handle 18. Welding, brazing, gluing or any other suitable means may be used for joining the holder 20 to handle 18. Handle 18, and holder means 20 may also be formed of flat retangular members to provide similar results.

In addition to handle 18, detachable clamp 28 is provided for further elongation of handle 18 for reaching remotely positioned curved windows.

In operation, a curved window may be cleaned with little waste of effort by first immersing said washer and wiper combination 10 into a cleaning solution which will quickly penetrate porous pad members 12, then applying said impregnated pad to the surface to be washed and thereafter reversing said pad and removing the remaining fluid from the surface by using wiper blade 14. An operator applying pressure to handle 18 transmits sufficient force to holder elements 21, 22, thereby causing pad surface 30 and wiper blade 14 to concavely conform to the concave surface. The result is intimate and continuous contact between blade 14 and the curved surface.

While a specific embodiment of the instant invention has been disclosed in the foregoing description, it will be understood that various modifications within the spirit of the invention may occur to those skilled in the art.

What is claimed is:

1. A combined sponge and squeegee for cleaning curved windshields comprising a handle, an elongated sponge pad secured to said handle, the pad having a concave face, and a flexible, elastic flange secured to said concave face and conforming to the shape thereof, the flange being provided with an integral squeegee blade extending at an angle thereto, the blade being deformed when the flange is secured to the sponge pad to present a concave working edge.

2. The combination of claim 1 wherein said pad includes a plurality of adhesively secured members, and wherein said flange is adhesively externally secured to a pad member.

3. The combination of claim 1 wherein said handle includes holder means securedly positioned at the upper portion of said handle, said holder means internally engaging said pad thereby causing said pad to elastically deform against a curved surface in response to pressure applied to said handle.

References Cited

UNITED STATES PATENTS

| 210,953 | 12/1878 | McCarthy. | |
| 1,840,023 | 1/1932 | Couture | 15—220 |
| 2,658,218 | 11/1953 | Carreiro | 401—203 |
| 2,678,458 | 5/1954 | Vosbikian et al. | 15—121 XR |
| 2,715,745 | 8/1955 | Jacobsen | 15—121 |
| 2,759,210 | 8/1956 | Cordis | 401—23 |
| 2,918,689 | 12/1959 | Pruett | 15—245 XR |
| 3,229,317 | 1/1966 | Linenfelser | 15—121 |
| 3,413,675 | 12/1968 | Westrum | 15—245 |

DANIEL BLUM, Primary Examiner

U.S. Cl. X.R.

15—244

UNITED STATES PATENT OFFICE
CERTIFICATE OF CORRECTION

Patent No. 3,526,918      Dated September 8, 1970

Inventor(s) Ragnvald G. Leland

It is certified that error appears in the above-identified patent and that said Letters Patent are hereby corrected as shown below:

In the grant (only), insert FIGURES 1, 2, 3, 4, 5 and 6.

Sept. 8, 1970      R. G. LELAND      3,526,918

FLEXIBLE WINDOW WASHER AND WIPER

Filed Sept. 24, 1968

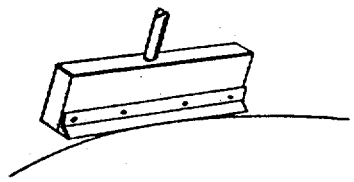

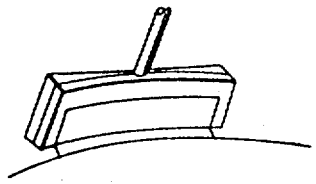

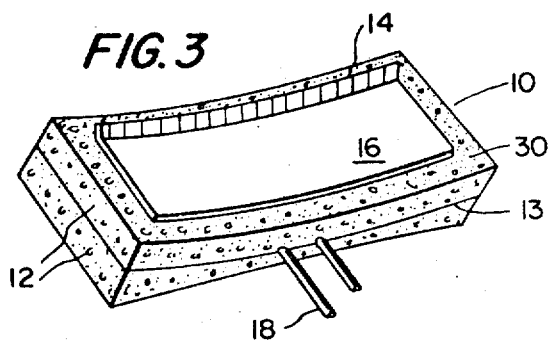

UNITED STATES PATENT OFFICE
CERTIFICATE OF CORRECTION

Patent No. 3,526,918     Dated September 8, 1970

Inventor(s) Ragnvald G. Leland     Page - 2

It is certified that error appears in the above-identified patent and that said Letters Patent are hereby corrected as shown below:

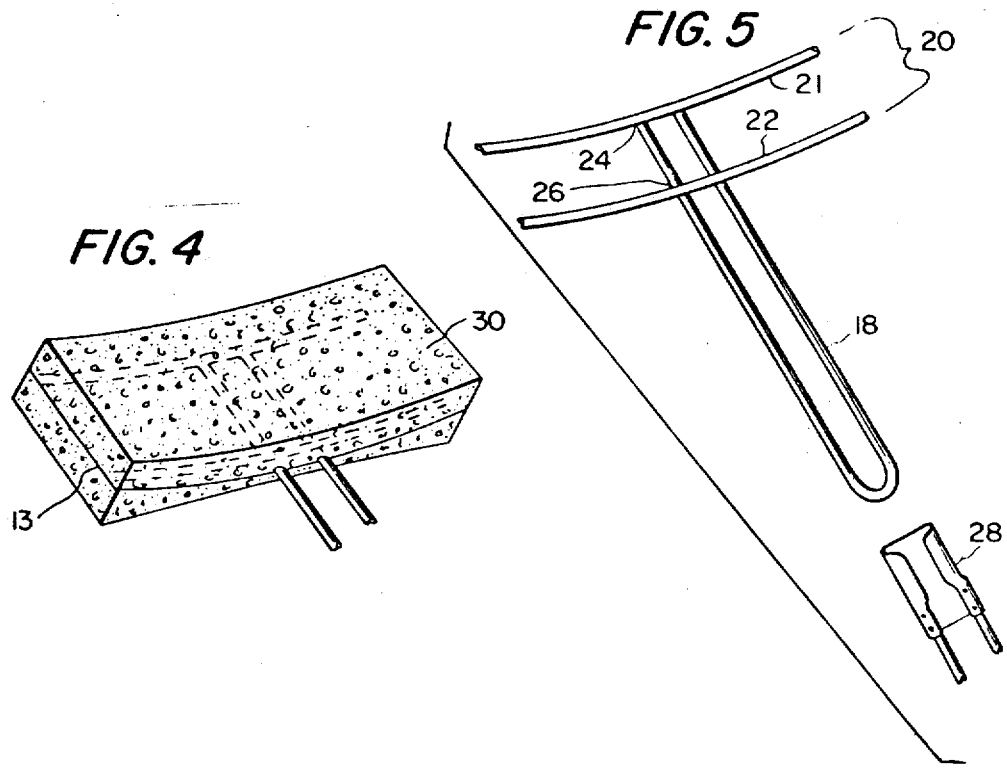

UNITED STATES PATENT OFFICE
CERTIFICATE OF CORRECTION

Patent No. 3,526,918          Dated September 8, 1970

Inventor(s) Ragnvald G. Leland        Page - 3

It is certified that error appears in the above-identified patent and that said Letters Patent are hereby corrected as shown below:

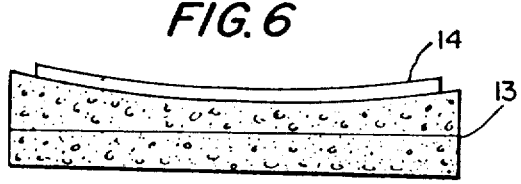

INVENTOR
RAGNVALD G. LELAND

BY *Derman, Landen & Derman*
ATTORNEYS

Signed and sealed this 29th day of February 1972.

(SEAL)
Attest:

EDWARD M. FLETCHER, JR.
Attesting Officer

ROBERT GOTTSCHALK
Commissioner of Patents